United States Patent [19]

Glachet

[11] Patent Number: 4,747,601

[45] Date of Patent: May 31, 1988

[54] DISCONNECTABLE SEALING DEVICE FOR LINKING TWO CLOSED VOLUMES WITHOUT BREAKING THE CONFINEMENT

[75] Inventor: Charles Glachet, Vendome, France

[73] Assignee: Societe Nouvelle d'exploitation de la Calhene, Velizy Villacoublay, France

[21] Appl. No.: 49,525

[22] Filed: May 14, 1987

[30] Foreign Application Priority Data

May 15, 1986 [FR] France ............................ 86 06984

[51] Int. Cl.[4] ........................................ F16J 15/10

[52] U.S. Cl. ............................ 277/12; 277/34; 277/226; 220/378

[58] Field of Search .................... 277/12, 32, 34, 34.3, 277/34.6, 184, 226, 165, 189; 220/378

[56] References Cited

U.S. PATENT DOCUMENTS

| | | | |
|---|---|---|---|
| 2,663,268 | 12/1953 | Ahnell | 220/378 X |
| 3,121,570 | 2/1964 | Gilbert | 277/34.3 |
| 3,225,956 | 12/1965 | Laming | 220/378 X |
| 3,381,988 | 5/1968 | Dewar | 277/189 X |
| 3,501,868 | 3/1970 | Janzinotti | 277/34.3 X |
| 4,470,608 | 9/1984 | Warren | 277/226 X |

FOREIGN PATENT DOCUMENTS

| | | | |
|---|---|---|---|
| 212136 | 1/1958 | Australia | 220/378 |
| 661613 | 6/1938 | Fed. Rep. of Germany | 220/378 |
| 3201467 | 7/1983 | Fed. Rep. of Germany . | |
| 1018746 | 10/1952 | France | 220/378 |
| 1346486 | 11/1963 | France . | |
| 1539845 | 8/1968 | France . | |
| 1082567 | 9/1967 | United Kingdom | 277/34.3 |

*Primary Examiner*—Robert S. Ward

*Attorney, Agent, or Firm*—Dennis P. Clarke

[57] ABSTRACT

In order to permanently ensure the confinement of two closed volumes with respect to the outside atmosphere, while permitting the linking of said volumes, use is made of two gaskets, each having in section an approximately circular and generally hollow part, as well as a part forming a member. One of the gaskets is mounted by its member in a groove formed in a door received in a flange of the volume, whereas the member of the other gasket is fixed in a groove formed in a flange in which is received a door of the other volume. During engagement, the circular parts of the gaskets are in tight contact with one another and on V-shaped inclined surfaces formed within the flange and on the periphery of the door.

7 Claims, 2 Drawing Sheets

DISCONNECTABLE SEALING DEVICE FOR LINKING TWO CLOSED VOLUMES WITHOUT BREAKING THE CONFINEMENT

BACKGROUND OF THE INVENTION

The invention relates to a disconnectable device for linking two closed volumes, such as a confinement enclosure and a transportation container, without breaking the confinement of said two volumes. Such a device is used in the nuclear industry, as well as in the chemical, medical, pharmaceutical and electronics industries.

Thus, in the nuclear and chemical industries the radioactive or dangerous nature of the products handled makes it necessary to confine these products in closed volumes to prevent any contamination of the external atmosphere. Conversely, in the pharmaceutical, medical and electronic industries, it is standard practice to have to work in a dustfree of sterile atmosphere. In this case, said atmosphere is also enclosed in a closed volume, so as to be protected against any contamination by the external atmosphere.

In all cases it is necessary to be able to have a means for introducing into and extracting from the closed volume products, devices and equipment of various types placed in another closed volume.

To this end, each of the closed volumes has at least one generally circular access opening defined by a flange and normally sealed by a door. The flanges and doors are provided with disconnectable fixing means making it possible to connect the flanges and doors of the two closed volumes. After opening the thus formed double door, the two closed volumes are linked and the transfers of products and equipment can take place.

In such a device, in order to permanently maintain the confinement of the closed volumes with respect to the external atmosphere, it is necessary to provide sealing joints, seals or gaskets of a particular type. Thus, any surface of the doors or flanges in contact with the outside atmosphere prior to engagement must necessarily be tightly separated from the closed volumes throughout the handling operations, i.e. both during engagement and when the double door is opened and introduced into one of the closed volumes. Conversely, the gaskets must also permanently ensure the confinement with respect to the external atmosphere of all surfaces of the flanges or plugs in contact with the internal atmosphere of the closed volumes when the doors are in place.

French Pat. No. 1 346 486 of the Commissariat a l'Energie Atomique describes a tight joining device between two tight enclosures, in which this result is obtained by using two joints having a curvilinear polygonal cross-section. These joints or gaskets are received in grooves having a square section and formed respectively in the door of one of the enclosures and in the flange of the other enclosure. When the enclosures are engaged and the double door is still in place, the desired confinement is obtained by a contact of the lips of the seals both with the groove in which they are received, with the door or flange of the corresponding closed volume and with the flange or door of the other closed volume.

Devices equipped with joints or seals of this type function in a satisfactory manner and in particular correctly ensure the desired confinement under normal usage conditions.

However, the use of lip seals, joints or gaskets is not completely satisfactory when significant pressure differences exist between the closed volumes and the external atmosphere. Thus, depending on whether the pressure within the closed volumes is below or above outside pressure, the lips of the seals must be differently oriented, which makes it necessary to use different seals in both cases. Moreover, in the hypothesis that the pressure gradient is provisionally reversed, there is a risk of the sealing quality suffering deterioration. Moreover, the manufacture of the lip seals described in French Pat. No. 1 346 486 requires special care, so that the costs thereof are increased.

The present invention relates to a disconnectable device making it possible to link two closed volumes without breaking the confinement thereof with respect to the external atmosphere, said device using gaskets of a novel type, which are simple and inexpensive and which can be used no matter whether the closed volumes are under an overpressure or underpressure with respect to the external atmosphere and which maintain the confinement even when they are subject to considerable pressure differences.

SUMMARY OF THE INVENTION

The present invention therefore specifically relates to a disconnectable device for linking two closed volumes without breaking the confinement thereof with respect to the external atmosphere, each of these closed volumes having at least one circular opening with a given axis, defined by a flange and normally sealed by a door, said device incorporating means for the disconnectable fixing of the doors to the flanges, means for the disconnectable fixing of the flanges to one another, means for the disconnectable fixing of the doors to one another and sealing means for permanently ensuring a confinment of said closed volumes with respect to the external atmosphere, wherein the sealing means comprise two annular gaskets, each having in section an approximately circular part and at least one projecting part forming a fixing member, the member of a first of gaskets being sealingly located in a groove formed in the door of a first of the closed volumes, the approximately circular part of said gasket being in tight contact with two surfaces inclined with respect to the axes of the openings and formed respectively on the flange of the first closed volume and on the door of the second closed volume when all the fixing means are connected, the member of the second gasket being sealingly located in a groove formed in the flange of the second closed volume, the approximately circular part of said second gasket being in tight contact with two other surfaces inclined with respect to the axes of the openings and respectively formed on the door of the second closed volume and on the flange of the first closed volume, as well as with the approximately circular part of the first gasket when all the fixing means are connected.

According to a preferred embodiment of the invention, each of the gaskets has a central recess with an approximately circular cross-section concentric to said approximately circular part.

The inclined parts can have an approximately rectilinear cross-section or can be concave and have a circular arc section whose radius is at least equal to the radius of the approximately circular parts of the gaskets.

The projecting parts of the gaskets can in particular be oriented parallel to the axes of the openings and have an approximately rectangular shape.

According to another feature of the invention, in the case where the first and second closed volumes are respectively a confinement enclosure and a transportation container, the enclosure door has flats cut at two diametrically opposite locations and separated by a maximum distance less than the internal diameter of the container and the flange of the container has notches at two diametrically opposite locations, the width of these notches exceeding the thickness of the door of the enclosure and the distance separating the bottom of these notches exceeding the maximum distance separating the cut flats.

BRIEF DESCRIPTION OF THE DRAWINGS

The invention is described in greater detail hereinafter relative to non-limitative embodiments of the invention and the attached drawings, wherein show.

DETAILED DESCRIPTION OF THE INVENTION

Figure 1:
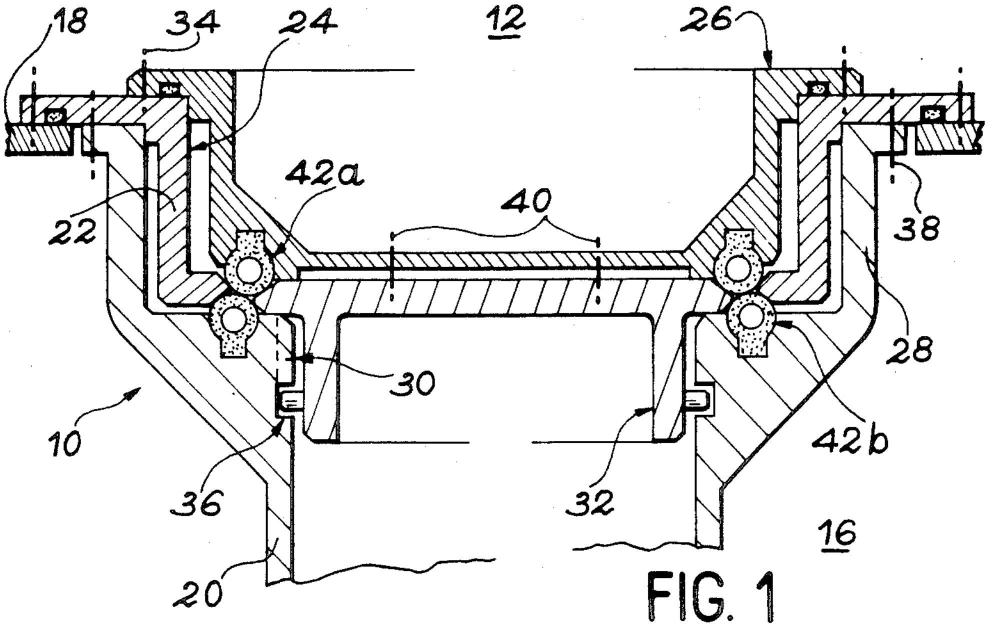
FIG. 1, a longitudinal sectional view diagrammatically showing a device according to the invention making it possible to link a container and an enclosure without breaking the seal of the closed volumes defined by them.

FIG. 1 shows a device 10 according to the invention for linking a closed volume 12 with a closed volume 14 without at any time interrupting the seal or the confinement between said closed volumes 12 and 14 and the external atmosphere 16.

In the embodiment of FIG. 1, the closed volume 12 is within a confinement enclosure, whereof part of the wall is shown at at 18. The closed volume 14 is constituted by the interior of a container, whereof part of the wall is shown at 20. It is obvious that device 10 according to the invention can be used for linking two closed volumes of different types, e.g. two confinement cells.

In known manner, wall 18 comprises a flange 22 defining a circular opening 24 normally sealed by a door 26. In a comparable manner, wall 20 of the container, which is generally cylindrical, is terminated at one of its ends by a flange 28 defining a circular opening 30, which is normally sealed by a door 32.

Also in known manner, dismantlable fixing means are provided between each of the doors 26, 32 and the corresponding flange 22, 28, between flanges 22 and 28, as well as between doors 26 and 32. These fixing means can be in any known form and can in particular be either mechanical or magnetic without passing beyond the scope of the invention.

For example, the mixed lines 34 in FIG. 1 diagrammatically illustrate screws or a similar mechanism by which door 26 is internally and dismantlably fixed in opening 24 of flange 22. Reference 36 designates a bayonet joint by which door 32 is fixed dismantlably to flange 28 of the container.

Mixed lines 38 correspond to screws or a similar mechanism by which container flange 28 can be dismantlably fixed to the enclosure flange 22 outside the same. Finally, mixed lines 30 diagrammatically represent screws or a similar mechanism by means of which covers 26 and 32 can be joined together in a dismantlable manner from the interior of the confinement enclosure.

As a result of this arrangement, openings 24 and 30 formed in flanges 22, 28 are normally sealed by doors 26, 32.

When the container is engaged on the enclosure, flange 28 is fixed to flange 22 by screws 38. In the same way, doors 26 and 32 are interconnected by screws 40. The thus formed double door 26, 32 is then dismantled by unscrewing screws 34 and then by turning the two doors in order to disconnect the bayonet system 36. Volumes 12 and 14 are then interlinked by their opening 24 and 30.

According to the invention, the sealing of the confinement between closed volumes 12 and 14 on the one hand and the external atmosphere 16 on the other is permanently maintained by two identical gaskets **42*a*, 42*b*, whereof the structure and arrangement will now be described with reference to FIG. 2. As gaskets 42*a*, 42*b* are identical, only the former will be described, the corresponding elements of gasket 42*b*** carrying the same references, followed by the letter b.

Gasket **42*a* is annular, being made from a deformable, tight material, such a silicone or an elastomer. Its outer surface has in section an approximately circular part 44*a* and an approximately rectangular projecting part 46*a* arranged radially with respect to part 44*a* and oriented parallel to the axis of the joint, i.e. parallel to the common axis of openings 24 and 30**, when the container is engaged on the enclosure.

Preferably, gasket **42*a* also has an approximately circular central recess 48*a* concentric to part 44*a***. This recess, which in certain cases can be eliminated, gives the gasket a greater flexibility.

Figure 2:
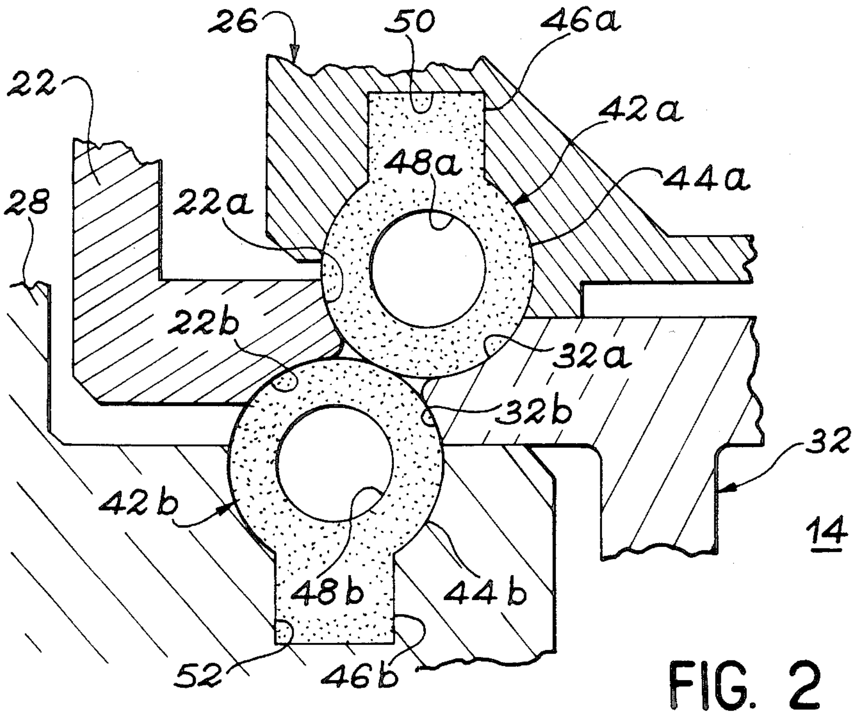
FIG. 2, A sectional view showing on a larger scale the gaskets used in the device of FIG. 1.

As can be gathered from FIG. 2, gaskets **42*a* and 42*b* have a symmetrical shape with respect to an axis passing through the centre of part 42*a* and oriented parallel to the axis of the joint. Part 46*a* of gasket 42*a* forms a fixing member by which said gasket is sealingly located in a groove 50 having a complimentary shape and formed on the end face of the cover 26** turned towards the outside of the enclosure.

According to another essential feature of the invention, when the container is engaged on the enclosure, i.e. when all the connecting means 34, 36, 38 and 40 are connected, the approximately circular part **44*a* of joint 42*a* is simultaneously in tight contact with two inclined surfaces 22*a*, 32*a* respectively formed on flange 22 and on door 32, as well as with the approximately circular part 44*b* of gasket 42*b***.

More specifically, surface **22*a* is formed in the interior of flange 22 in a small diameter part of said flange close to the outside of closed volume 12. Moreover, surface 22*a* is inclined with respect to the axis of opening 24, so as to be turned towards closed volume 12**.

Surface **32*a* is formed on the periphery of door 32, on a large diameter portion thereof being located in the small diameter portion of flange 22 when the container is engaged on the enclosure. Surface 32*a* is inclined with respect to the axis of opening 30, so as to be turned towards the outside of closed volume 14**.

Part **46*b* of the second gasket 42*b* also forms a fixing member, which is received in complementary groove 52 formed in container flange 28 on a face of the latter turned towards the outside of closed volume 14**.

When all the fixing means 34 to 40 are connected in the manner illustrated in the drawings, the approximately circular part 44*b* of gasket 42*b* is simultaneously in tight contact with two other inclined surfaces 22*a*, 32*b* respectively formed on flange 22 and on door 32, as well as with part 44*a* of gasket 42*a*.

More specifically, surface 22*b* is formed on the small diameter portion of flange 22 and extends surface 22*a* towards the outside with respect to closed volume 12, so that said small diameter portion has an approximately V-shaped cross-section. Moreover, surface 22*b* is inclined with respect to the axis of opening 24 towards the outside of closed volume 12.

In comparable manner, surface 32*b* is formed on the large diameter portion of door 32 and extends the surface 32*a* towards the interior of closed volume 14, so that said large diameter portion has an approximately V-shaped cross-section. Surface 32*b* is inclined with respect to the axis of opening 30 towards the inside of closed volume 14.

In the embodiment shown in FIG. 2, surfaces 22*a*, 32*a*, 22*b* and 32*b* are concave surfaces having in cross-section the shape of a circular arc, whose radius is approximately equal to the radius of parts 44*a* and 44*b* of the gaskets.

This configuration only constitutes an embodiment, the radii of the circular arcs formed by said surfaces also being able to exceed the radii of gasket portions 44*a* and 44*b*. In a not shown variant, surfaces 22*a*, 32*a*, 22*b* and 32*b* can also be frustum-shaped surfaces having an approximately rectilinear cross-section. This variant has the advantage of simplifying the machining of the surfaces.

In summarizing, the invention makes it possible to bring about the desired sealing through the combination of two approximately toroidal gaskets 42*a*, 42*b* fixed by members respectively in door 26 and in flange 28, each of the flanges being tightly contactable by at least one point of its section with the other gasket and with inclined surfaces formed on flange 22 and on door 32.

Figure 3:
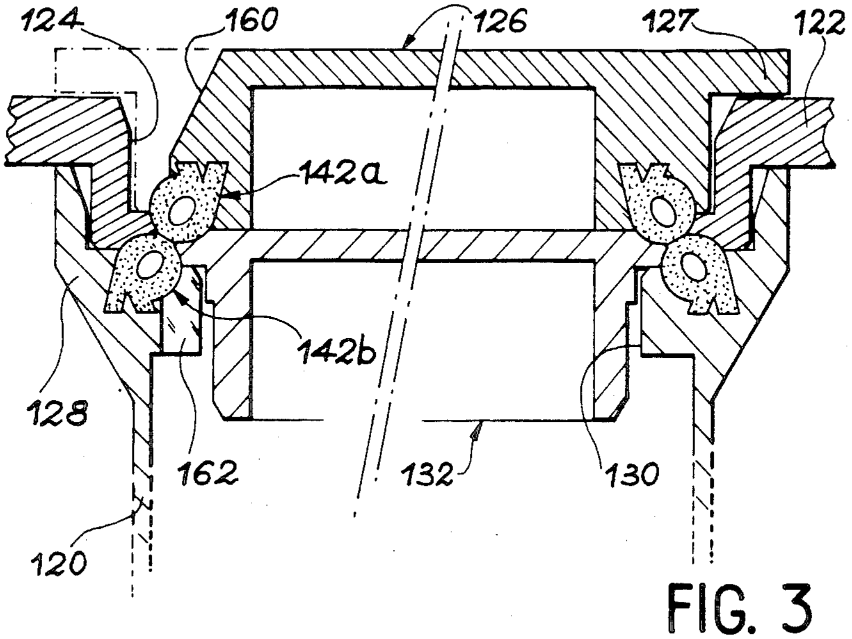
FIG. 3, a diagrammatic sectional view comparable to FIG. 1 illustrating a second embodiment of the invention.
Figure 4:
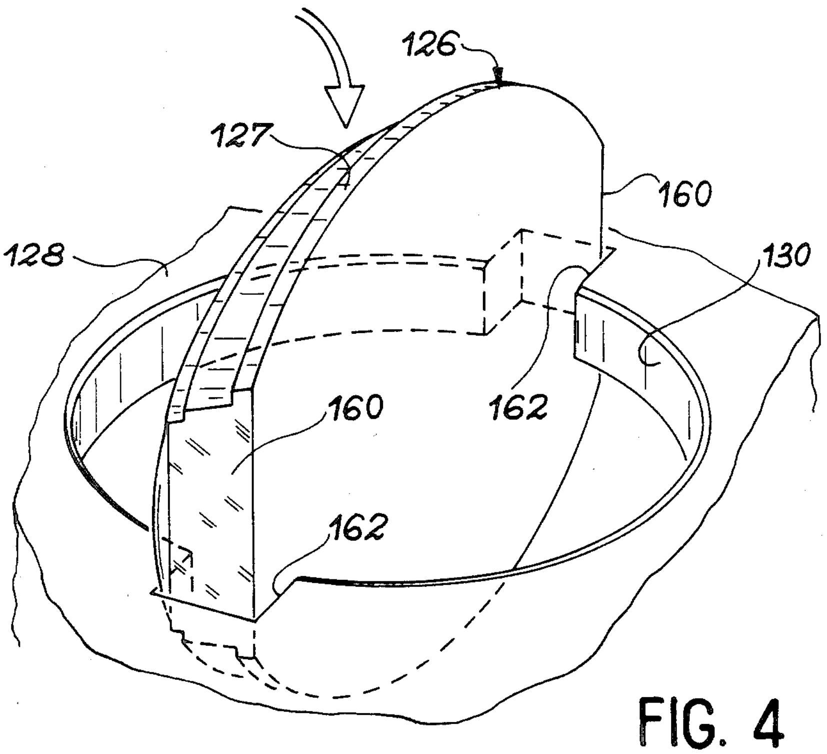
FIG. 4, a perspective view diagrammatically showing the passage through the container flange of the enclosure door in the device according to FIG. 3.

FIGS. 3 and 4 show an embodiment of the invention revealing another advantage provided by it.

In the connecting devices using conventionally designed gaskets, the replacement of gaskets associated with the enclosure door causes a problem which is difficult to solve. Thus, in order to permit the replacement of said gasket, the door must be removed from the enclosure, which can only be brought in general by a similar, but larger device giving access to another container. It is thus immediately clear that the replacement of the gasket carried by the larger diameter door of an enclosure is impossible.

FIGS. 3 and 4 show that the device according to the invention makes it possible to solve this problem by permitting the passage of the enclosure door through the opening which it normally seals. Thus, it becomes possible to replace the gasket associated with said door by evacuating the same through the associated container, following the introduction into the enclosure of a door equipped with a new gasket and conveyed by the same container.

To facilitate understanding, components identical to those of the embodiment of FIGS. 1 and 2 carry the same numerical references, increased by 100.

FIG. 3 shows flange 122 defining in the enclosure wall the circular opening 124 normally sealed by door 126. On said flange 122 is centered the end of flange 128 defining the circular opening 130 at the open end of the container wall 120. Said opening 130 is normally sealed by door 132.

The sealing of the connection is ensured by an annular gasket 142*a* mounted on door 126 and an annular gasket 142*b* mounted on flange 128. Each of these gaskets 142*a*, 142*b* comprises in section an approximately circular or O-shaped hollow part and a two-part member, each of the two parts of the latter being oppositely inclined with respect to a straight line oriented parallel to the axis of the gasket. For the gasket 142*a* of door 126, said straight line is displaced inwards with respect to the circular part of the gasket. However, it is displaced outwards with respect to the circular part of gasket 142*b*. Thus, the two gaskets 142*a* and 142*b* have an approximately R-shaped cross-section.

The two-part member of gasket 142*a* is located in a groove formed on the end face of door 126 turned towards the outside of the insulator in the vicinity of the peripheral edge of said face. The circular part of gasket 142*a* normally bears against a frustum-shaped or curvilinear surface formed on flange 122 and turned towards the interior of the cell. When the container is connected to flange 122, the circular part of gasket 142*a* also bears on a frustum-shaped or curvilinear surface formed at the intersection of the outer face and the peripheral edge of cover 132 and between said surfaces of flange 122 and cover 132 on the circular portion of gasket 142*b*.

In a comparable manner, the two-part member of gasket 142*b* is located in a groove formed on the end face of flange 128 turned towards the outside of the container in the vicinity of opening 130. The circular part of the gasket bears against a frustum-shaped or curvilinear surface formed on the outer peripheral edge of door 132 and turned towards the inside of the container when said door is in place. In the same way, when the container is connected to the insulator, the circular part bears against a frustum-shaped or curvilinear surface formed at the intersection of the outer face and the inner peripheral edge of flange 122 and against the circular part of gasket 142*a*.

As illustrated in FIG. 3, the relative diameters of gaskets of 142*a* and 144*a* are such that the external diameter of gasket 142*a* is approximately equal to the diameter of gasket 142*b* at the centre of its circular portion. Conversely, the internal diameter of gasket 142*b* is approximately to the diameter of gasket 142*a* at the centre of its circular portion.

As is illustrated by the right-hand part of FIG. 3, door 126 comprises within the cell a flange 127 which normally bears against the inner face of flange 122. However, to permit the passage of door 126 into the openings formed in flanges 122 and 128, its outer peripheral edge has at two diametrically opposite locations cut flats 160 between which the maximum distance is less than the internal diameter of the container. One of these flats is shown in the left-hand part of FIG. 3. As illustrated in the latter, the maximum distance between the flats exceeds the external diameter of the member of gasket 142*a*, but is less than the external diameter of said gasket.

Moreover, the part of flange 128 projecting into the container, in order to define opening 120, has two notches 162 located at diametrically opposite locations. The width of these exceeds the thickness of door 126 and the distance separating the bottoms of the notches exceeds the maximum distance separating the flats 160 of door 126, so that the latter can traverse flange 128 after being inclined by 90°, when flats 160 are positioned facing notches 162, as illustrated in FIG. 4. Moreover, the distance separating the bottoms of notches 162 exceeds the internal diameter of gasket 142*b* and is less than the internal diameter of the member of said joint. Obviously the invention is not limited to the embodiments described in exemplified manner hereinbefore and covers all variants thereof.

Thus, the central recess formed in the gaskets can optionally be eliminated. In the same way, the members ensuring the fixing of the gaskets can have shapes differing from those described. It has also be seen that the surfaces on which the joint or gasket tightly bears can have different shapes. Finally, it is pointed out that the dismantlable fixing means to be provided between the flanges and the doors can be subject to numerous different constructions without passing outside the scope of the invention.

What is claimed is:

1. A disconnectable device for linking two closed volumes without breaking the confinement thereof with respect to the external atmosphere, each of these closed volumes having at least one circular opening with a given axis, defined by a flange and normally sealed by a door, said device incorporating means for the disconnectable fixing of the doors to the flanges, means for the disconnectable fixing of the flanges to one another, means for the disconnectable fixing of the doors to one another and sealing means for permanently ensuring a confinement of said closed volumes with respect to the external atmosphere, wherein the sealing means comprise two annular gaskets, each having in section an approximately circular part and at least one projecting part forming a fixing member, the member of a first of said gaskets being sealingly located in a groove formed in the door of a first of the closed volumes, the approximately circular part of said gasket being in tight contact with two surfaces inclined with respect to the axes of the openings and formed respectively on the flange of the first closed volume and on the door of the second closed volume when all the fixing means are connected, the member of the second gasket being sealingly located in a groove formed in the flange of the second closed volume, the approximately circular part of said second gasket being in tight contact with two other surfaces inclined with respect to the axes of the openings and respectively formed on the door of the second closed volume and on the flange of the first closed volume, as well as with the approximately circular part of the first gasket when all the fixing means are connected.

2. A device according to claim 1, wherein each of the gaskets has a central recess with an approximately circular cross-section concentric to the approximately circular part.

3. A device according to claim 1, wherein said inclined surfaces have an approximately rectilinear cross-section.

4. A device according to claim 1, wherein said inclined surfaces are concave and have a circular arc cross-section, whose radius is at least equal to the radius of the approximately circular parts of the gaskets.

5. A device acording to claim 1, wherein the projecting parts of the gaskets are oriented parallel to the axes of the openings and have an approximately rectangular shape.

6. A device according to claim 1, wherein the first and second closed volumes are respectively a confinement enclosure and a transportation container, the door of the enclosure having flats cut at two diametrically opposite locations separated by a maximum distance less than the internal diameter of the container and the flange of the container has notches at two diametrically opposite locations, the width of these notches exceeding the thickness of the door of the enclosure and the distance separating the bottom of said notches exceeding the maximum distance separating the flats.

7. A device according to claim 6, wherein the projecting part of the gasket mounted on the door of the enclosure is displaced inwards wtih respect to the circular part of the gasket, the projecting part of the gasket mounted on the container flange being displaced outwards with respect to the circular part of said gasket.

* * * * *